Feb. 19, 1957
L. T. KNOCKE
2,781,687
ASSEMBLY COMPRISING CALIBRATED BOLT AND
CALIBRATED DEFORMABLE CONICAL WASHER
Filed Feb. 24, 1954
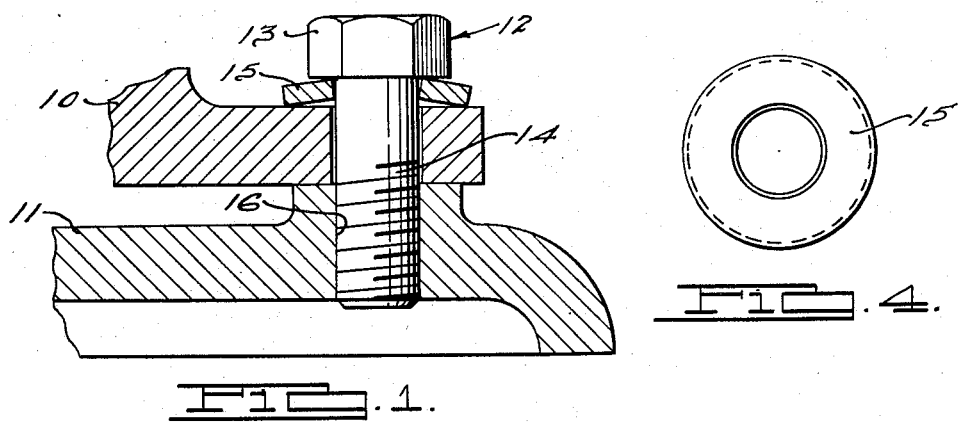
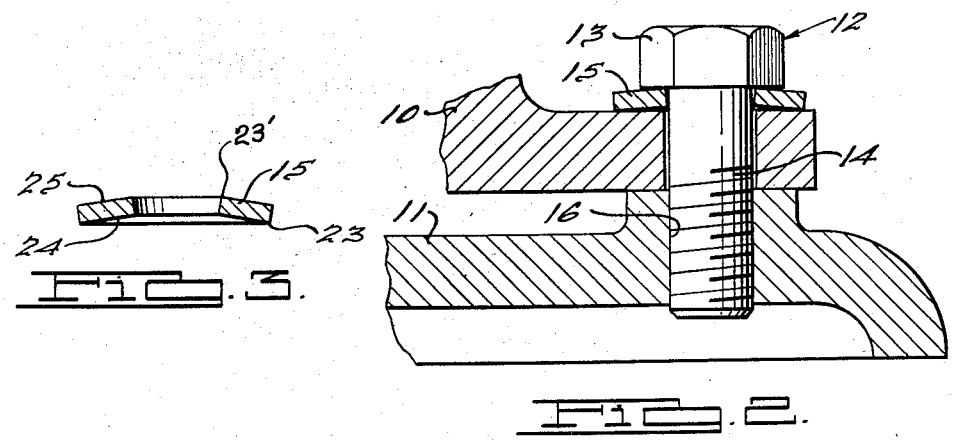
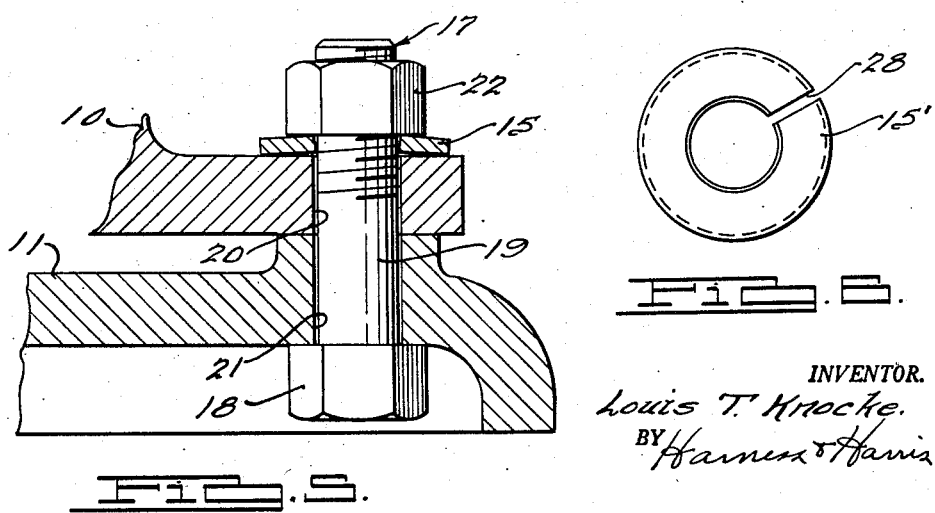
INVENTOR.
Louis T. Knocke.
BY Harness & Harris.
ATTORNEYS.

United States Patent Office 2,781,687
Patented Feb. 19, 1957

2,781,687

ASSEMBLY COMPRISING CALIBRATED BOLT AND CALIBRATED DEFORMABLE CONICAL WASHER

Louis T. Knocke, Birmingham, Mich., assignor to Chrysler Corporation, Highland Park, Mich., a corporation of Delaware Application February 24, 1954, Serial No. 412,233

1 Claim. (Cl. 85—62)

This invention relates to an improved washer and more particularly to an improved assembly of a washer with a fastening device such as a stud, screw or the like.

One of the main objects of the invention is to provide an improved washer of this kind which has physical characteristics specifically tailored with respect to the bolt, stud or screw with which it is assembled in use.

A further object of the invention is to provide a washer of this kind which is of frusto-conical shape having a cone height which is at least slightly greater than the maximum reduction of the grip thickness of the assembly in which it is employed.

A further object of the invention is to provide a washer of this kind which is deflectable from its permanent cone height to a substantially flat state under a force substantially equal to the elastic proof load of the stud, bolt or screw with which it is used.

Another object of the invention is to provide a washer of this character which has a comparatively large continuous and uninterrupted bearing surface contact with the work and head or nut of the bolt with which it is assembled and which accordingly holds all parts of the threaded structure against unintended loosening rotation.

An additional object of the invention is to provide an improved washer in a clamped together assembly of the kind described which has a sharp outer sealing edge and relatively broad contact faces that are adapted to produce leakproof fluid seals.

A still further object of the invention is to provide in a clamped together assembly a washer that will exert an entirely higher order of nut and bolt locking forces throughout a materially larger range of reduction of the grip thickness of the assembly than has heretofore been made possible with conventional lock washers and the like.

An illustrative embodiment of the invention is shown in the accompanying drawing, in which:

Fig. 1 is a sectional view of a washer, screw and work assembly embodying the invention and showing the washer in substantially relaxed state.

Fig. 2 is a view similar to Fig. 1 but showing the washer in substantially its fully compressed and flattened state.

Fig. 3 is a sectional view showing the washer in its free state.

Fig. 4 is a plan view of the washer shown in Fig. 1.

Fig. 5 is a view similar to Fig. 2 but showing a modified assembly of the washer with a bolt, nut and pieces of work.

Fig. 6 is a view similar to Fig. 4 but showing a washer embodying a modified form of the invention.

It has heretofore been the practice to employ lock washers having sharp edges or protruding portions of relatively small contact area which dig into the work and the bolt head or nut to prevent loosening rotation of the threaded parts of an assembly. In these structures the washers or the like have been designed to compress to a substantially flattened state under a compressive force materially below the elastic proof load of the bolt, screw or stud with which it is associated. As a result, even a slight reduction in grip thickness of a clamped together assembly caused a complete loss of the expansive action of the washer between the work and the bolt head or nut and an according loss of nut or bolt locking action. In other existing lock washers such as the helical split type, for example, the deflection rate is so low that even when the washer is compressed to a flat state, there is insufficient force to effectively lock the threaded parts and thus when the grip thickness of an assembly having one of those washers is reduced even only slightly, the holding or nut or bolt locking power is entirely inadequate. Clamping pressures are limited in such prior art devices by the tendency of the relatively small area projecting portions thereof to embed in the work or head or nut portions and the relatively low spring rate of the washers.

In the form of the invention illustrated in Figs. 1 to 4 inclusive, an assembly comprising work parts 10 and 11 is arranged to be clamped together by a screw, generally designated by the numeral 12, having a head 13, and threaded shank 14. The head of the screw 13 is spaced from the upper work part 10 by a frusto-conical shaped washer 15 which is disposed between the lower side of the head 13 and the upper surface of the work part 10, as shown in Fig. 1. Fig. 2 shows the above assembly firmly clamped together with the screw 13 tightly threaded in the threaded opening 16 of the lower work part 11 and the washer 15 is in its substantially flattened state.

The assembly shown in Fig. 5 is similar to that shown in Figs. 1 to 4 and corresponding parts are designated by the same numerals as in Figs. 1 to 4, inclusive. However, the fastening device of the assembly shown in Fig. 5 includes a bolt, generally designated by the numeral 17, having a head 18, adjacent the lower work part 11, a shank 19 extending through registering passages 20 and 21 in the work parts 10 and 11 respectively, and a nut 22 threaded on the upper end of the shank 19. A frusto-conical washer 15 is disposed between the lower side of the nut 13 and the upper side of the work part 10.

The washers 15 shown in Figs. 1 to 5 inclusive, are specifically tailored to the particular fastening means with which they are associated and the work to be clamped together. The frusto-conical washer 15 has a relaxed permanent cone height at least slightly larger than the maximum reduction in the grip thickness of the work. The cone height may in some instances be much greater than this value. The grip thickness may be considered as the total distance between the laterally extending abutments of the assembly between which clamping pressure is applied. In the case of the assembly shown in Fig. 2, the grip thickness is the distance between the lower side of the head 13 of the screw 12 and the upper side of the work part 11, while in the assembly shown in Fig. 5, the grip thickness is the distance between the upper and lower sides of the bolt head 18 and nut 22. In many assemblies this includes crushable gaskets and/or yieldable seals of various types. It has been found that a safe cone height can be taken as approximately one to three percent of the outside diameter of the washers. This general proportion may be followed in a washer that meets the following specifications.

The washer 15 is so formed and proportioned in dimensions as to require a compressive force to bring it to a substantially flat state which is approximately equal to the elasticproof load of the fastening member with which it is employed. That is, the force required to substantially flatten the washer 15 from its relaxed permanent cone height is equal to the established elasticproof load of the screw 12 or the bolt 17. These values for screws, bolts and studs of wide ranges of dimensions and materials are available in recognized engineering handbooks and other technical sources.

The washer 15 also has sharp edged corners 23 and 23' at the outer periphery of its concaved side surface 24 and at the inner periphery of the convexed side 25, respectively. The concaved and convexed side surfaces 24 and 25, respectively, of the washer 15 have relatively broad, continuous uninterrupted surfaces 24 and 25 which present relatively large contact areas that, in conjunction with the large expansive force of the compressed washer 15, exerts a tremendous nut, bolt or screw locking friction. When using a frusto-conical washer embodying my invention in connection with a five-sixteenths inch low carbon, cold headed steel bolt, for example, the force required to compress the washer to a substantially flat state is approximately 4000 pounds. A conventional helical lock washer customarily used with an identical five-sixteenths inch bolt would require to compress it to a substantially flat state only approximately 100 pounds compressive force. These conventional nut, bolt and screw locking devices depend upon digging of projections of small contact area into the work, nut or bolt head and thus locking power of such devices is relatively limited and rapidly decreases as the devices sink into the work or the grip thickness decreases due to compression. A washer having its physical characteristics tailored as set forth above, to the physical characteristics of the fastening means with which it is associated will exert a tremendous frictional locking force which, due to the permanent cone height of the washer will be maintained at a high value even though the grip thickness of the assembly decreases substantially. The bolt, screw or stud is protected from forces exceeding its elasticproof load for when the washer embodying my invention becomes substantially flattened, there is presented a recognizable opposition to its further compression which is readily detectable before the force applied exceeds the elastic limit of the bolt, which limit is well above its elasticproof load.

The washer 15' shown in Fig. 6 is identical in shape, construction and physical characteristics to the washer 15 of Figs. 1 to 5, inclusive, except that it is provided with a generally radial slot 28. It is found that the slot 28 may be provided in the washer 15' while at the same time maintaining the force required to substantially flatten it at approximately the elasticproof load of the fastening device with which it is used.

The extremely large force of compression to which washers embodying my invention are subjected, the broad contact surfaces and their sharp outer edges 23 assure safe friction locking of the part of the fastening devices against loosening and provide fluid tight seals around the shanks of the nut, screws or bolts employed.

While I have illustrated and described but several embodiments of my invention, it is to be understood that such is for the purpose of illustration only, and it is contemplated that those skilled in the art may modify certain details without departing from the spirit or scope of the invention as defined in the claim appended hereto.

I claim:

A bolted together assembly comprising a bolt having a predetermined elasticproof load and spaced abutments between which clamping pressure is applied to the assembly by stressing the bolt, a washer on said bolt compressed by said clamping pressure between said abutments into a substantially flattened condition, said washer having in its relaxed state a frustoconical shape and a permanent cone height at least slightly greater than the maximum reduction in the spacing of said abutments effected by stress of the bolt to a value approximately equal to its elasticproof load, the maximum resistance of said washer to compression from its permanent cone height being approximately equal to the elasticproof load of the bolt.

References Cited in the file of this patent

UNITED STATES PATENTS

| | | |
|---|---|---|
| 2,464,152 | Ralston | Mar. 8, 1949 |
| 2,546,332 | Costello | Mar. 27, 1951 |